US006984805B2

(12) United States Patent
Shimogama et al.

(10) Patent No.: US 6,984,805 B2
(45) Date of Patent: Jan. 10, 2006

(54) ARC WELDER

(75) Inventors: Shigeru Shimogama, Hyogo (JP);
Yasushi Mukai, Osaka (JP); Hidetoshi Oyama, Osaka (JP); Wataru Takahashi, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 148 days.

(21) Appl. No.: 10/451,770

(22) PCT Filed: Sep. 26, 2002

(86) PCT No.: PCT/JP02/09925

§ 371 (c)(1),
(2), (4) Date: Jun. 24, 2003

(87) PCT Pub. No.: WO03/028934

PCT Pub. Date: Apr. 10, 2003

(65) Prior Publication Data

US 2004/0045945 A1    Mar. 11, 2004

(30) Foreign Application Priority Data

Sep. 28, 2001   (JP) .............................. 2001-300646

(51) Int. Cl.
*B23K 9/10*   (2006.01)
(52) U.S. Cl. .............................. 219/124.34; 219/130.5; 901/42

(58) Field of Classification Search ............. 219/125.1, 219/124.34, 130.5; 901/42
See application file for complete search history.

(56) References Cited

U.S. PATENT DOCUMENTS

| | | | |
|---|---|---|---|
| 5,233,158 A | * | 8/1993 | Karakama et al. ...... 219/130.33 |
| 5,812,408 A | * | 9/1998 | Karakama et al. .......... 700/212 |
| 5,834,916 A | * | 11/1998 | Shimogama et al. .. 318/568.13 |
| 6,004,019 A | | 12/1999 | Suita et al. |
| 6,021,361 A | * | 2/2000 | Taninaga et al. .............. 901/42 |

FOREIGN PATENT DOCUMENTS

| | | |
|---|---|---|
| EP | 0993896 | 4/2000 |
| JP | 60-68167 | 4/1985 |
| JP | 9-85443 | 3/1997 |
| JP | 9-239540 | 9/1997 |
| JP | 10-58157 | 3/1998 |
| JP | 2000-117435 | 4/2000 |
| JP | 2001-1144 | 1/2001 |

OTHER PUBLICATIONS

International Search Report for PCT/JP02/09925 dated Dec. 9, 2002 Form PCT/ISA/210 English translation.

* cited by examiner

*Primary Examiner*—Clifford C. Shaw
(74) *Attorney, Agent, or Firm*—RatnerPrestia

(57) ABSTRACT

The present invention provides an arc welder in which a robot controller of a teaching playback type robot and a welding power source are of digital control type and the robot controller and the welding power source are coupled through a bus. A welding condition command required for welding and a real welding condition are transmitted digitally through the bus in a parallel mode.

15 Claims, 16 Drawing Sheets

Bus slots

Welding controller

Arc sensor controller

Welding start command
(Arc on sequence)

| Order | Sequential commands |
|---|---|
| 1 | Turn on gas valve |
| 2 | Turn on torch switch |
| 3 | Wait for welding current detection |
|  |  |
|  |  |
|  |  |

Welding end command
(Arc off sequence)

| Order | Sequential commands |
|---|---|
| 1 | Turn off torch switch |
| 2 | Wait 0.4 seconds |
| 3 | Start stick check |
| 4 | Wait 0.3 seconds |
| 5 | Finish stick check |
| 6 | Turn off gas valve |

FIG. 10A

| 12-bit | A/D data conversion | |
|---|---|---|
| Hex | Decade | Volt |
| 7FF | 2047 | +9.98936V |
| \| | \| | \| |
| 001 | 1 | +4.88mV |
| 000 | 0 | 0V |
| FFF | -1 | -4.88mV |
| \| | \| | \| |
| 800 | -2047 | -9.98936V |

FIG. 10B 12-bit wire position data
4000pulse/rev

| Hex | Pulse | Angle |
|---|---|---|
| FFF | | |
| \| | } ~ Incorrect data | |
| FA1 | | |
| FAD | 4000 | 360deg |
| \| | \| | \| |
| 001 | 1 | 0.09deg |
| 000 | 0 | 0deg |

FIG. 10C

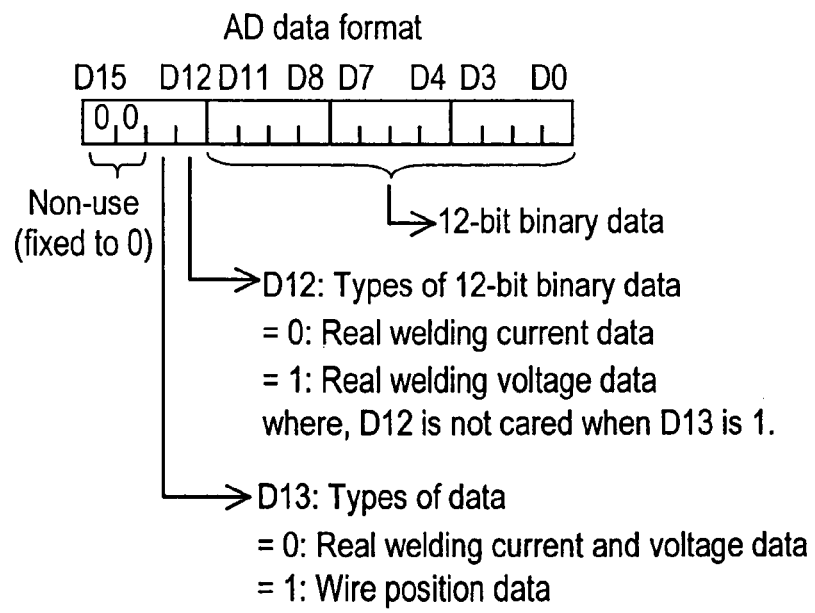

AD data format

D15 D12 D11 D8 D7 D4 D3 D0

Non-use (fixed to 0)

→ 12-bit binary data

→ D12: Types of 12-bit binary data
= 0: Real welding current data
= 1: Real welding voltage data
where, D12 is not cared when D13 is 1.

→ D13: Types of data
= 0: Real welding current and voltage data
= 1: Wire position data

FIG. 12

| Option | Set contents | Change contents | |
|---|---|---|---|
| —Sensor— | spin arc2 | — 1/3 — | 21 |
| • Current detector | | 600(A) | |
| • Maximum following distant | | 100(mm) | |
| • Sensor signal | left right (current, voltage) | | |
| | up down (current, voltage) | | |

「Page up」 ↓          ↑ 「Page down」

| Option | Set contents | Change contents | |
|---|---|---|---|
| —Sensor— | spin arc2 | — 2/3 — | 21 |
| • Detected phase | front | 0(deg) | |
| | back | 90(deg) | |
| • Rotating head | | 1 | |
| • Rotation diameter | | 1.5(mm) | |
| • Rotation speed | | 50(Hz) | |

「Page up」 ↓          ↑ 「Page down」

| Option | Set contents | Change contents | |
|---|---|---|---|
| —Sensor— | spin arc2 | — 3/3 — | 21 |
| • Robot installation | | Standard | |
| | | Ceiling suspended | |
| • Rotating head | | Wall mounted | |
| • Welding method | CO2/MAG | Pulse arc | |

ARC WELDER

This application is a U.S. National Phase Application of PCT International Application No. PCT/JP02/09925.

TECHNICAL FIELD

The present invention relates to a welding apparatus such as an arc welder for a welding robot system formed of a combination of a robot, a welding power source, and an arc sensor controller.

BACKGROUND ART

Technology of conventional example 1 provides an arc welder formed of a combination of a robot controller of a teaching playback type robot and a control portion of a welding power source as disclosed in Japanese Patent Unexamined Publication No. H9-85443. The arc welder is controlled in the following steps of:

transmitting a welding current command signal and a welding voltage command signal as analog voltage signals to the robot controller;

converting each inputted analog command signal to digital data with the welding power source; then determining a welding current command value and a welding voltage command value; and capturing them with a welding condition control portion.

Technology of conventional example 2 provides a welding apparatus formed of a combination of a robot controller body of a teaching playback type robot and a control portion of a welding power source in FIG. 16. This technology is disclosed in Japanese Patent Unexamined Publication No. 2000-117435. Both the robot controller body and the control portion perform digital control, and have a digital communication control portion. A welding condition command including a welding current command value is digitally transmitted from the robot controller body to the control portion of the welding power source through the communication control portions.

Technology of conventional example 3 is disclosed in Japanese Patent Unexamined Publication No. H10-58157, and employs system bus 221 as shown in FIG. 17. In conventional example 3, welding current controller 228 controls welding current flowing through an electrode for spot welding (not shown). Robot central processing unit (CPU) portion 220 controls synchronously welding current controller 228 and applied pressure controller 227 via system bus 221.

Robot CPU 220 controls the controllers based on welding condition data stored in a memory so that applied pressure and welding current change synchronously in a plurality of stages.

Technology of conventional example 4 employs an arc welding sensor as shown in FIG. 18. Communication by the arc welding sensor and communication of a control portion of a welding condition in the welding power source are independent.

In conventional example 1, the control systems are digital circuits including a microcomputer as a main body. In the interface with the welding power source as discussed above, the welding control is performed in the following steps of:

digital-analog (D/A) converting the digital welding current command value and welding voltage command value to analog command values on the robot side based on respective output characteristic curves;

transmitting the analog values to the welding power source side; and analog-digital (A/D) converting the analog values to digital values again on the welding power source side based on respective output characteristic curves.

Analog circuits are thus interposed though the control systems are the digital circuits, so that a conversion error occurs. There are the following problems. The welding current command value and welding voltage command value transmitted from the robot side are not equal to the welding current command value and welding voltage command value received by the welding power source side. The control systems are affected by analog drift by environment change (especially, temperature) and secular change.

Conventional example 2 addresses the problems of the analog interface of conventional example 1. The robot controller body and the control portion of the welding power source perform digital control, and have the digital communication control portion. A welding condition command is digitally transmitted from the robot controller body to the control portion of the welding power source through the communication control portions by a serial communication method. Analog conversion period in conventional example 1 is 70 to 80 msec. While, serial communication period in conventional example 2 is 9 to 10 msec, namely smaller comparing with the conventional example 1.

In performing the welding, however, work for starting the welding often takes much time even in conventional example 2. For example, at least, a welding start command (arc-on sequence) must be executed in starting arc welding as in the sequence of FIG. 9A, and a welding end command (arc-off sequence) must be executed in finishing the arc welding as in the sequence of FIG. 9B.

A welding control portion spends much time on welding control itself, so that the welding control portion can make a welding error when much information is intended to be communicated between the robot controller body and the control portion of the welding power source during the welding control.

For preventing such a problem, the execution of a series of welding start commands or welding end commands is started slightly before a welding start point or a welding end point. In this method, the control is triggered depending on timing, so that the start of the arc welding can be failed when the timing is off.

When the robot body intends to move to a next teaching point while a wire is stuck to a work piece, the robot body can damage a torch. When a serial communication for transmitting information between a control portion of an arc sensor or the like and the robot controller is added to the welding apparatus, real time control can be damaged.

When serial communication speed is simply increased, many communication failures occur especially due to tungsten-inert-gas (TIG) high-frequency noise under welding environment, thereby resulting in delay by a re-communication process.

In conventional example 3, the applied pressure controller, the welding current controller for controlling the welding current flowing through the electrode for spot welding, and a welding condition database are interconnected through the bus. Therefore, information transmission path is shortest, and the robot CPU can perform easy, speedy, and accurate control without requiring complex timing adjustment of a communication procedure or the like.

However, the welding apparatus in conventional example 3 switches between the applied pressure control and the welding current control, simply using a welding elapsed time as a trigger in welding. The welding condition database including welding output characteristic curves is directly read from the bus of the robot CPU. The robot CPU captures welding current information from a welder, real applied pressure information by a load cell or the like, and feedback information of a chip's tip position by a laser sensor, and synchronizes the real applied pressure with the welding current in real time. Thus, optimal adaptive control is realized in response to a behavior of a work piece. However, optimal adaptive control is not realized over the whole welding route having a certain length of the arc welding.

The welding apparatus in conventional example 4 has an arc welding sensor as discussed above. The arc welding sensor includes a current detector for detecting required real welding current and a resistor for detecting required real welding voltage, and the current detector and the resistor are interconnected in a circuit. Additionally, this welding apparatus includes similar detectors for the real welding current and voltage for welding control also in the welding power source.

A bleeder resistor in the welding power source and the resistor for detecting welding voltage disposed in the arc welding sensors are interconnected in parallel between the + output terminal and the − output terminal of the welding power source, so that welding voltage drops. A DCCT (Hall device) in the welding power source and a current detector disposed in the arc welding sensors are connected to the + output terminal of the welding power source in series and the impedance increases, so that detected current value deviates from a true current value especially in steep change of welding current.

Information communication speed on a serial communication line is largely restricted depending on noise resistance and real time processing performance, so that the arc sensor cannot be precisely controlled during welding.

DISCLOSURE OF THE INVENTION

The present invention provides an arc welder having a robot controller and a welding power source. The robot controller is coupled to the welding power source through an address/data bus (this is called bus hereinafter). At least one of a welding condition required for welding and a real welding condition including at least one of welding current and welding voltage during welding is digitally communicated through the bus between the robot controller and the welding power source in a parallel mode.

BRIEF DESCRIPTION OF THE DRAWINGS

FIG. 10A shows 12-bit A/D data conversion of real welding current and voltage values.

FIG. 10B shows 12-bit wire position data in detecting real welding current and voltage values.

FIG. 10C is an A/D data format.

FIG. 12 shows an example of parameter setting on an arc sensor controller.

DETAILED DESCRIPTION OF PREFERRED EMBODIMENTS

Exemplary embodiments of the present invention will be described hereinafter with reference to the accompanying drawings.

(Exemplary Embodiment 1)

Figure 1:
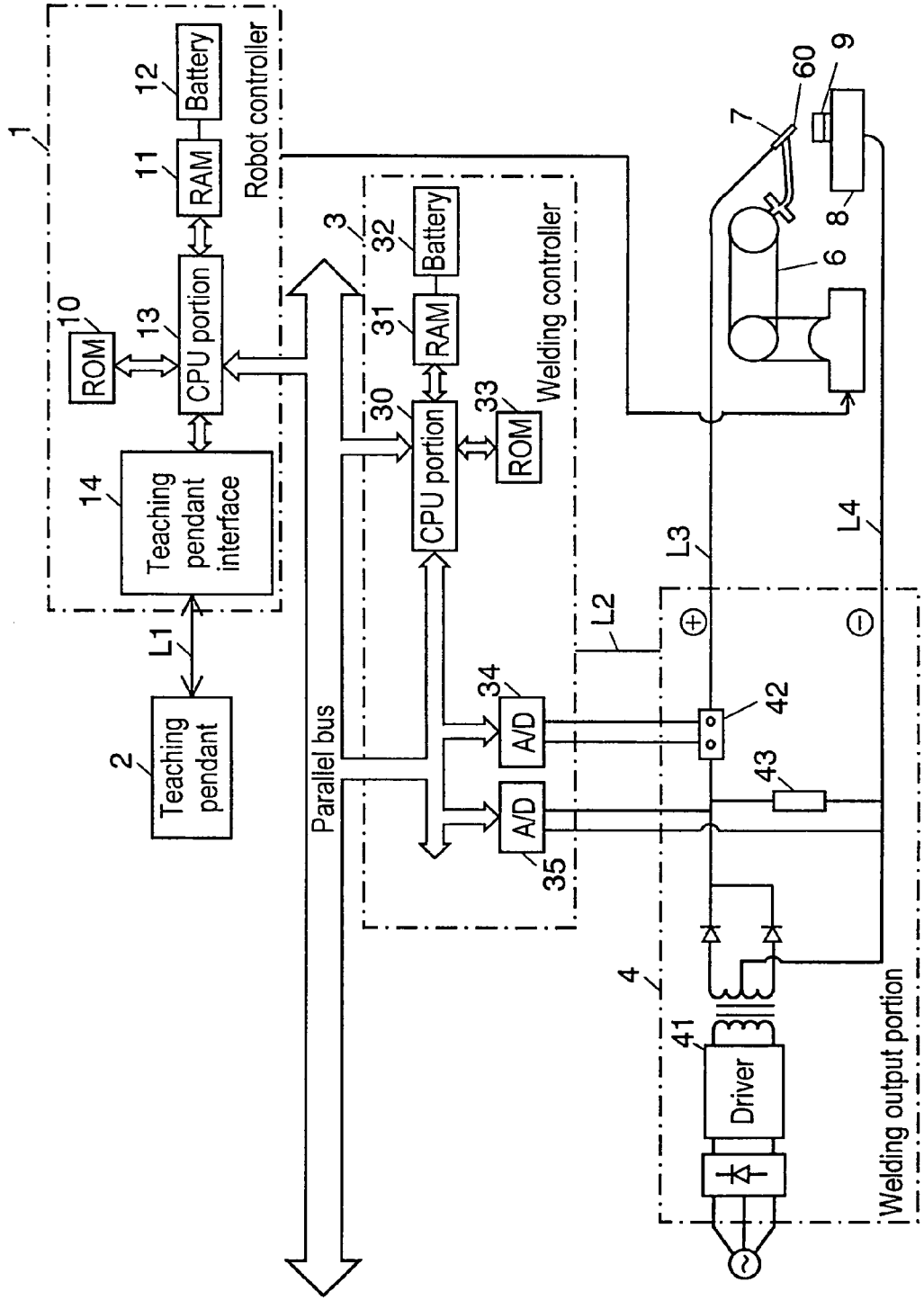
FIG. 1 is a block diagram of an arc welder in accordance with exemplary embodiment 1 of the present invention.

FIG. 1 is a block diagram of an arc welder in accordance with exemplary embodiment 1 of the present invention. In this arc welder, robot controller 1 is coupled to welding controller 3 through a parallel bus. In FIG. 1, the arc welder of exemplary embodiment 1 has robot controller 1, teaching pendant (hereinafter, TP) 2, welding controller 3, welding output portion 4, robot body 6, welding torch 7, base metal 8, work piece 9, random access memory (RAM) 11, CPU portions 13, 30, teaching pendant interface (hereinafter, I/F for TP) 14, A/D converters 34, 35 for welding current and welding voltage, communication control line L1, control line L2, + output L3, and − output L4.

The arc welder of embodiment 1 also has driver 41, current detector 42 such as DCCT (Hall device), voltage detector 43 employing a bleeder resistor or the like, and consumable electrode (hereinafter, wire) 60.

Figure 5:
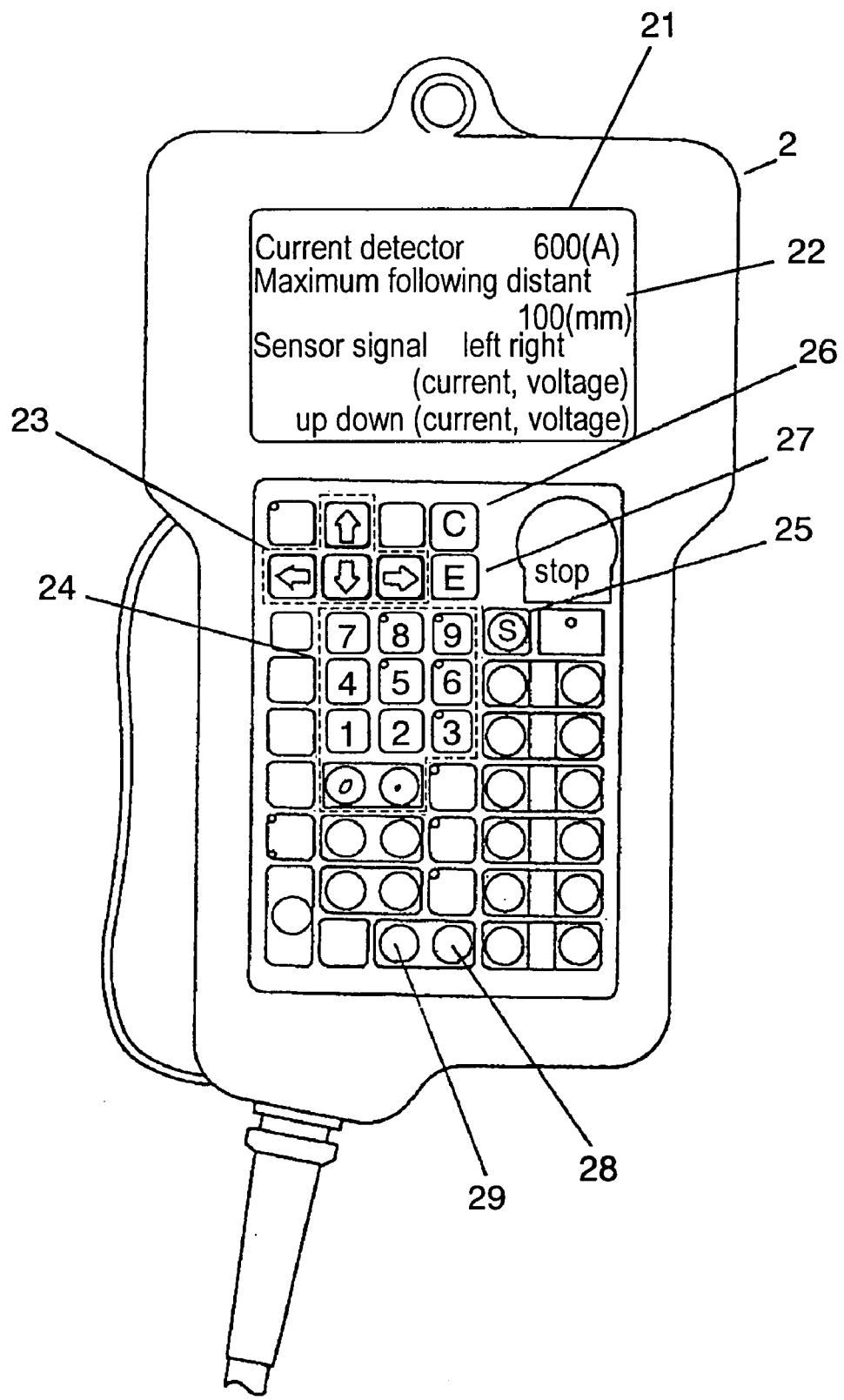
FIG. 5 is an outline drawing of a teaching pendant.

FIG. 5 shows welding registration key 28 and welding end key 29.

CPU portion 13 of robot controller 1 is directly coupled to CPU portion 30 of welding controller 3 through the parallel bus. TP 2 is coupled to CPU portion 13 through communication control line L1 and I/F 14 for TP, and CPU portion 13 is coupled to RAM 11. Robot controller 1 is coupled to robot body 6.

CPU portion 30 of welding controller 3 is coupled to RAM 31 and A/D converter 34, 35, and reads outputs from A/D converters 34, 35. Welding controller 3 is coupled to welding output portion 4 through control line L2. A/D converters 34, 35 convert current and voltage detected by current detector 42 and voltage detector 43 of welding output portion 4 from analog to digital, and output them.

Welding output portion 4 has driver 41, is coupled to wire 60 through + output L3, and is coupled to base metal 8 through − output L4. Welding output portion 4 also has current detector 42 in + output L3 and has voltage detector 43 between + output L3 and − output L4.

Robot body 6 has welding torch 7, wire 60 is supplied to welding torch 7, and work piece 9 is coupled to − output L4 of welding output portion 4 through base metal 8. Robot body 6 welds work piece 9 fixed to base metal 8 using wire 60 as an electrode.

TP 2 has an outline shown in FIG. 5, has a storage key, and stores a program to be taught.

Operations of the arc welder having the configuration discussed above will be described hereinafter.

Firstly, a teaching operation of the program is described. For teaching tasks desired to be executed by robot body 6, an operator operates TP2, precisely moves robot body 6 while directly looking at welding torch 7 disposed at a control reference point of robot body 6, and teaches the tasks in orderly sequence.

Figure 4:
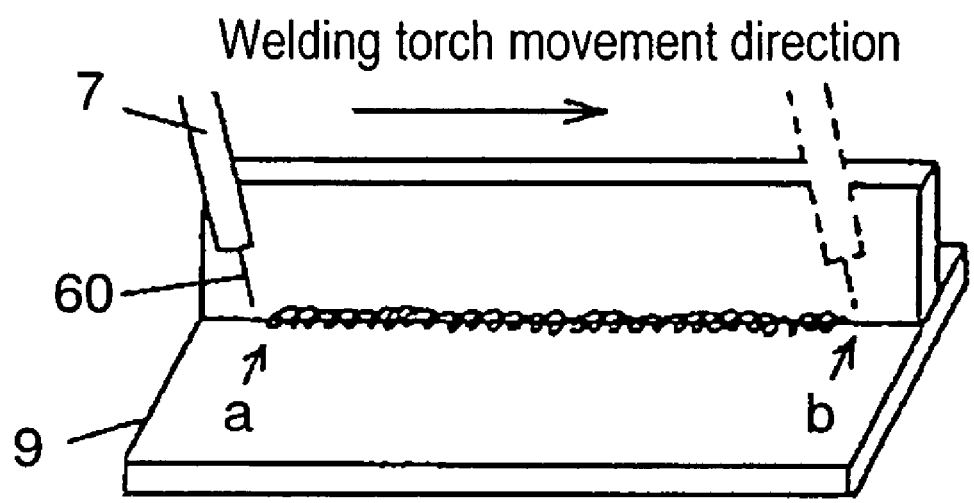
FIG. 4 is a schematic perspective view showing a welding process.

The operator firstly fixes work piece 9, namely a welded object, to base metal 8, and operates TP2 to teach a welding start point of welding torch 7 to robot body 6. This method is specifically described with reference to a schematic perspective view showing a welding process in FIG. 4. In FIG. 4, the operator moves welding torch 7 to point a, namely the welding start point, and registers teaching position data, the fact that point a is the welding start point, and an instruction used for executing a welding condition command and a welding start command (arc-on sequence) shown in FIG. 9A. The welding condition command includes welding current command value 200 A and welding voltage command value 24.0V in the case of FIG. 4. This registration can be performed with one key, namely welding registration key 28 on TP 2 shown in FIG. 5.

Figures 8, 9A, 9B:
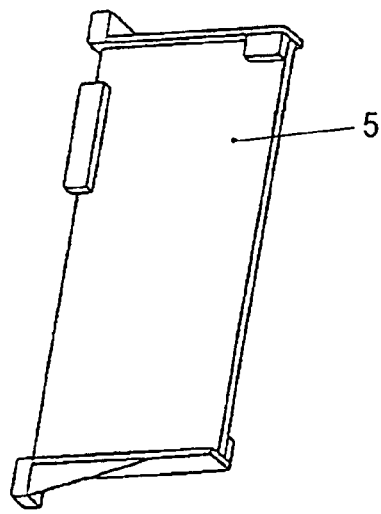
FIG. 8 shows an arc sensor controller coupled through a bus.
FIG. 9A shows a welding start command (arc-on sequence).
FIG. 9B shows a welding end command (arc-off sequence).

The operator then moves welding torch 7 to point b of FIG. 4, namely the welding end point, and registers teaching position data, the fact that point b is the welding end point, and an instruction used for executing a crater welding condition command and welding end command (arc-off sequence) shown in FIG. 9B. The welding condition command includes welding current command value 160 A and welding voltage command value 21.5 V in the case of FIG. 4. This registration can be performed with one key, namely welding end key 29 on TP 2. Thus, the program is taught to robot body 6.

The taught program is processed in CPU portion 13 and stored as data into RAM 11 through I/F 14 for TP and the parallel bus in FIG. 1. The welding system of FIG. 1 is automatically operated based on the taught program.

The welding operations performed based on the taught program are then described. When welding torch 7 of robot body 6 reaches a predetermined welding start position of work piece 9, namely point a of FIG. 4, based on the taught program, robot controller 1 transmits the previously stored welding condition as binary data of immediate values to welding controller 3 through the parallel bus. This welding condition includes the welding current command value 200 A and the welding voltage command value 24.0 V in the case of FIG. 4. Then, the welding start command (arc-on sequence) shown in FIG. 9A is executed. When an arc sensor signal indicating reply is transmitted from welding controller 3, welding torch 7 executes the arc welding along a predetermined welding route of work piece 9 at a predetermined welding speed.

The welding control is then described.

CPU portion 30 of welding controller 3 transmits the welding start command to welding output portion 4 through control line L2 in a control circuit (not shown). When welding output portion 4 receives the welding start command, driver 41 of welding output portion 4 operates to generate welding energy, the welding energy is transmitted from + output L3 to wire 60, and a wire supplying device (not shown) supplies wire 60 to welding torch 7.

When wire 60 contacts with work piece 9, the electric energy of about 200 A and 24.0 V transfers from the tip of the wire to the work piece to start welding of parts of metals in wire 60 and work piece 9, namely start the arc welding. On starting the arc welding, welding controller 3 transmits an arc answer command to robot controller 1 through the parallel bus. Robot controller 1, on receiving the arc answer command, starts movement of robot body 6 at the predetermined welding speed based on previously stored teaching data, and executes the welding by moving welding torch 7 along the predetermined welding route of work piece 9.

During this welding, for performing the welding control along the welding condition, welding controller 3 converts current and voltage detected by current detector 42 and voltage detector 43 disposed in welding output portion 4 to digital real welding current and voltage values with A/D converters 34, 35, respectively. Welding controller 3 stores the converted values in RAM 31, and averages the values every sampling time to control the welding.

When welding torch 7 reaches the welding end point, namely point b of FIG. 4, robot controller 1 transmits the taught crater welding condition as binary data of immediate values to welding controller 3 through the parallel bus in a parallel communication method. This welding condition includes the welding current command value 160 A and the welding voltage command value 21.5 V in the case of FIG. 4. Then, the welding end command (arc-off sequence) shown in FIG. 9B is transmitted and executed. At this time, a known stick check is performed. When wire 60 is not fused to work piece 9, welding torch 7 moves to a next teaching point.

Thus, the welding operations are performed based on the taught program.

Figure 11:
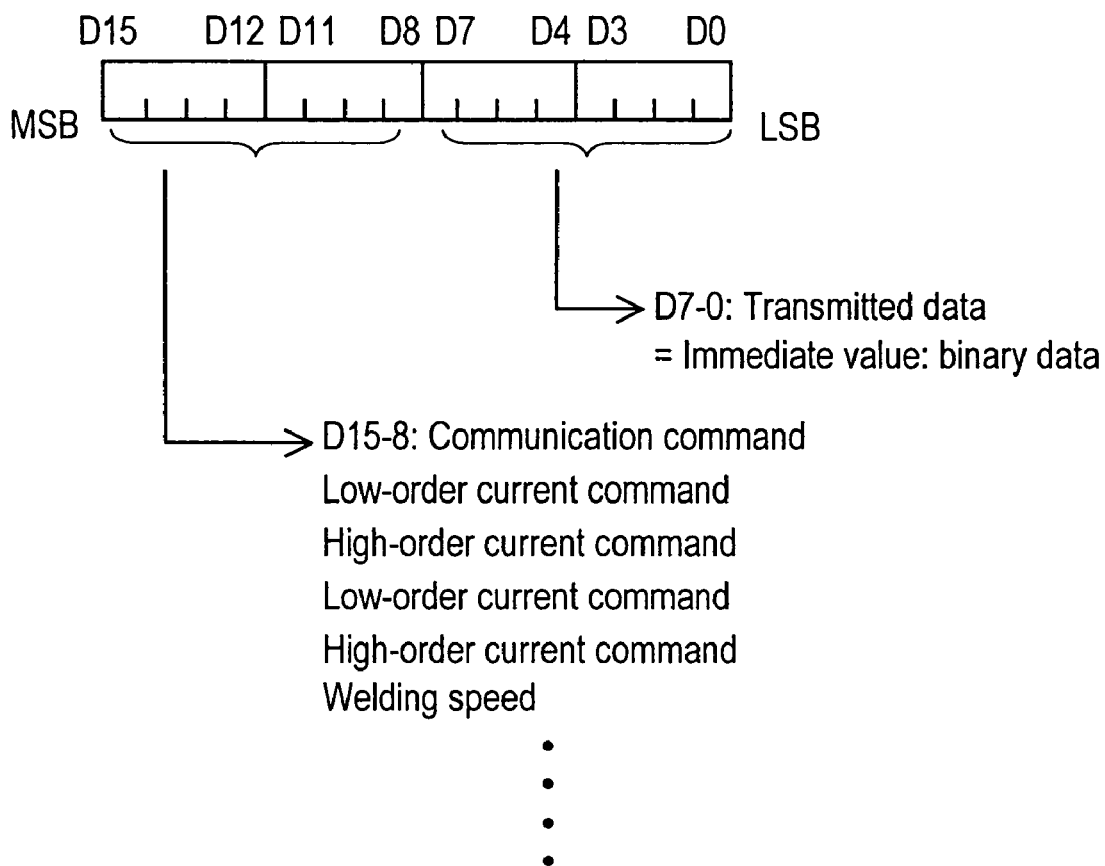
FIG. 11 is a communication data format.

Next, a data format of transmitted data and a communication command in embodiment 1 is described with reference to FIG. 11. FIG. 11 is the communication data format.

When welding torch 7 reaches the taught welding start position, robot controller 1 stops robot body 6 and transmits the welding condition as binary data of immediate values to welding controller 3 through the parallel bus, as discussed above. CPU portion 30, namely a digital circuit portion, receives the welding condition as immediate values. The detail description of the specification of the communication protocol at this time is omitted. Each controller coupled to the parallel bus is assigned in a memory map I/O, and therefore a desired controller can be selected by setting a predetermined address.

The data format of the communication command is described with reference to FIG. 11. The welding current command value is transmitted as a pair of data:

communication command character code a (41$h$) in upper bits D15 to D8 and a low-order value (up to 255) of the welding current command value of binary form corresponding to the command in lower bits D7 to D0; and communication command character code b (42$h$) in upper bits D15 to D8 and a high-order value (256 or more) of the welding current command value corresponding to the command in lower bits D7 to D0.

The welding voltage command value is transmitted as a pair of data:

communication command character code c (43$h$) in upper bits D15 to D8 and a low-order value (up to 255) of the welding voltage command value corresponding to the command in lower bits D7 to D0, and communication command character code d (44*h*) in upper bits D15 to D8 and a high-order value (256 or more) of the welding voltage command value corresponding to the command in lower bits D7 to D0.

Then, communication command character code e (45*h*) in upper bits D15 to D8 and a welding speed (up to 255) corresponding to the command in lower bits D7 to D0 are transmitted as data.

The welding current and voltage command values and the welding speed are transmitted from robot controller 1 to welding controller 3. At this time, 10 times the welding voltage command value and 100 times the taught welding speed are transmitted, and are divided by 10 and 100 on the receiving (welding controller) side, respectively.

As discussed in the description of FIG. 1, specifically, welding current command value 200 A and welding voltage command value 24.0 V are previously transmitted as the welding condition from robot controller 1 in welding controller 3. Welding current command value 200 A is transmitted as a pair of data:

16-bit data of communication command character code a (41*h*) in upper bits D15 to D8 and C8*h* corresponding to the command in lower bits D7 to D0, and 16-bit data of communication command character code b (42*h*) in upper bits D15 to D8 and 00*h* corresponding to the command in lower bits D7 to D0.

Welding voltage command value 24.0V is transmitted in parallel as a pair of data:

16-bit data of communication command character code c (43*h*) in upper bits D15 to D8 and F0*h* corresponding to the command in lower bits D7 to D0, and 16-bit data of communication command character code d (44*h*) in upper bits D15 to D8 and 00*h* corresponding to the command in lower bits D7 to D0.

When the welding start command (arc-on sequence) such as a welding start command substantially having only a command code is then transmitted, CPU portion 30 of welding controller 3 transmits the welding start command to welding output portion 4 via control line L2 in a control circuit (not shown).

The data format of transmitted data and a communication command has been described.

The arc welder of the arc welding robot system of exemplary embodiment 1 has digital circuits that mainly include microcomputers as control systems in robot controller 1 and welding controller 3. The arc welder is of a teaching playback type for commanding the welding condition (welding current value and welding voltage value) to the welding controller, and robot controller 1 and welding controller 3 are inter-coupled through the parallel bus. When welding torch 7 disposed in robot body 6 reaches a welding start point, the welding condition can be transmitted digitally in parallel.

When welding torch 7 reaches a welding end point, similarly, the crater welding condition (welding current value and welding voltage value) can be transmitted digitally in parallel.

Figure 6:
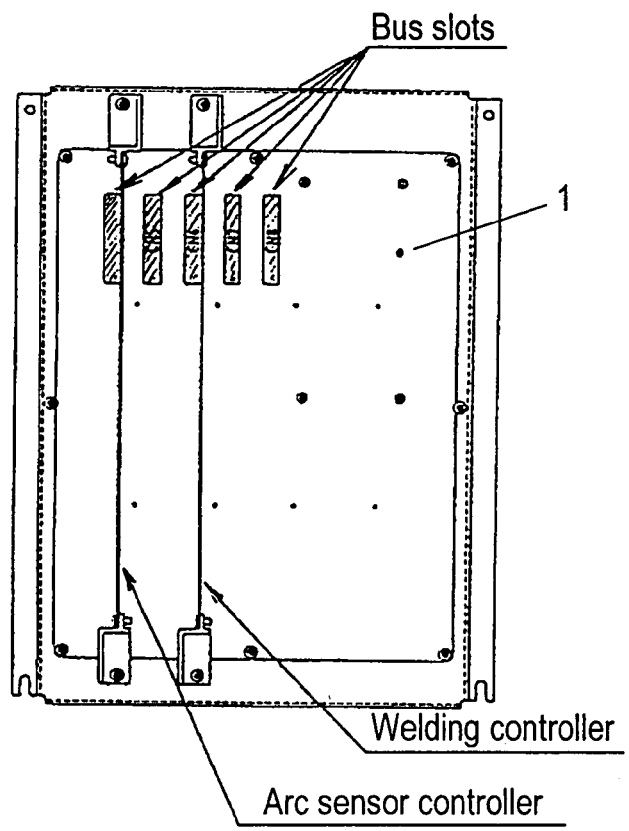
FIG. 6 shows bus slots for bus coupling.
Figure 7:
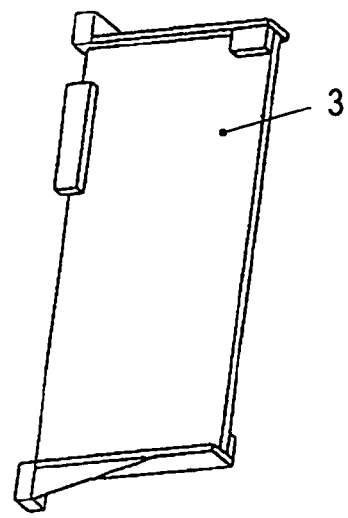
FIG. 7 shows a welding controller coupled through a bus.

Specifically, a rack mounting type motherboard having a plurality of bus slots is disposed in robot controller 1 as shown in FIG. 6, and a welding controller shown in FIG. 7 is inserted into one of the bus slots for connection.

The arc welder of exemplary embodiment 1 thus addresses problems where the arc welder has a conversion error due to the mediation of the analog circuit and is affected by a drift due to environment change (especially, temperature) and secular change.

The processing period of the arc welding robot system of exemplary embodiment 1 is 0.5 msec or shorter. This period is extremely shorter than analog conversion period 70 to 80 msec of conventional example 1, and is also extremely shorter than serial communication period 9 to 10 msec of conventional example 2. Therefore, the arc welding robot system can perform speedy information transmission from robot controller 1 to welding controller 3 and rapid welding control. The execution of a series of welding start commands (arc-on sequence) or welding end commands (arc-off sequence) does not need to be started slightly before the welding start point or the welding end point. In other words, control by snap decision is not required, and the tact time can be reduced with a reliable welding result secured.

(Exemplary Embodiment 2)

An arc welding robot system having an arc welding sensor in accordance with exemplary embodiment 2 will be described hereinafter.

Figure 2:
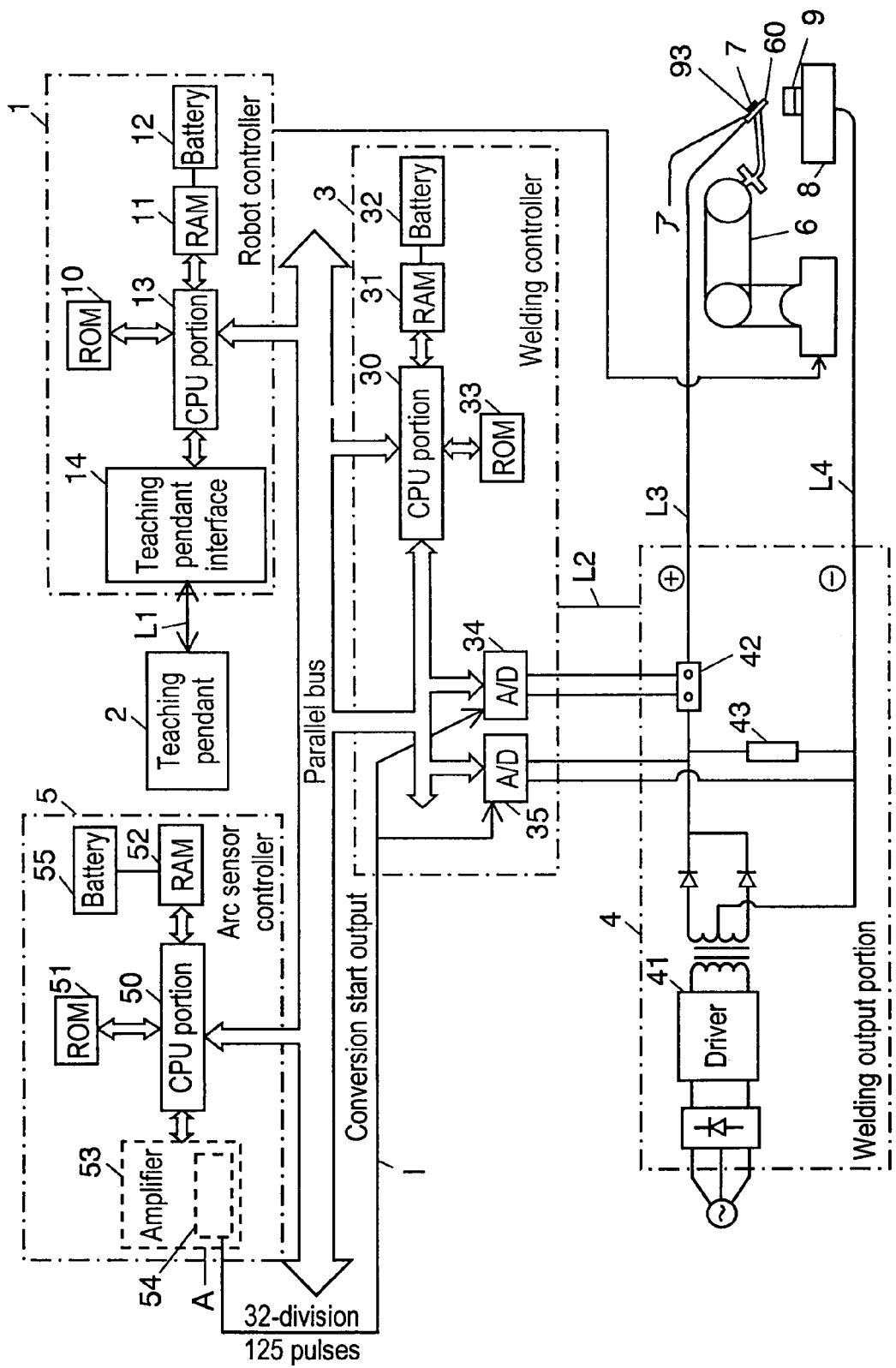
FIG. 2 is a block diagram of an arc welder in accordance with exemplary embodiment 2 of the present invention.

In FIG. 2, in addition to the elements in exemplary embodiment 1, the arc welder of exemplary embodiment 2 has arc sensor controller 5, CPU portion 50, read only memory (ROM) 51, RAM 52, amplifier 53, 12-bit UP/DOWN counter 54, arc sensor 93, control line A, and signal line I. Same elements used in exemplary embodiment 1 in FIG. 1 are denoted with the same reference numbers, and their detailed descriptions are omitted.

CPU portion 50 of arc sensor controller 5 is coupled to CPU portion 13 of robot controller 1 and CPU portion 30 and A/D converters 34, 35 of welding controller 3 through a parallel bus. Welding torch 7 of robot body 6 has arc sensor 93, and is coupled to amplifier 53 through control line A. Amplifier 53 is coupled to A/D converters 34, 35 through signal line I.

Coupling of robot controller 1 to robot body 6 or welding controller 3, a teaching method of a program to the robot, an automatic operation, and a data format are the same as those in embodiment 1, and the descriptions of them are omitted.

Figure 13A:
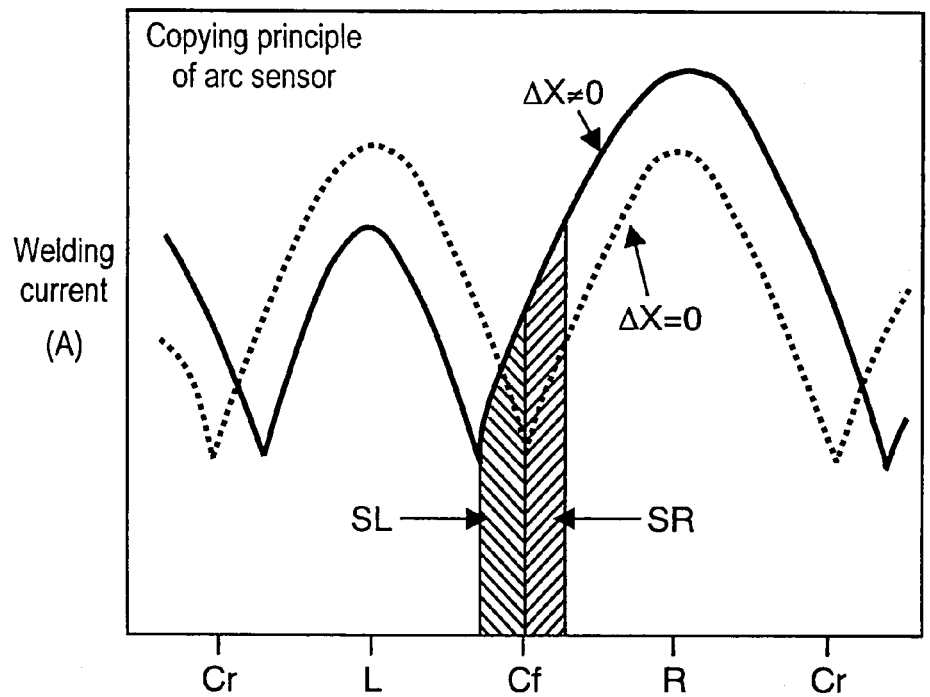
FIG. 13A shows a copying principle of an arc sensor.

A control method of the arc sensor is described with reference to FIG. 13A, FIG. 13B, and FIG. 13C before the arc welding robot system having the arc sensor of embodiment 2 is described with reference to FIG. 2. During arc welding, the arc sensor detects "displacement" (X-axis direction of FIG. 13C) between an arc generation point and a welding progress line and change (Y-axis direction of FIG. 13C) between a work piece and the arc generation point, based on real welding current and voltage values, using characteristics of welding arc and welding power source. The mechanism of the arc sensor has two methods: a weaving method of oscillating the tip of the robot body with a frequency of several Hz, and a wire revolving method of revolving the wire with several tens Hz by forming a revolving mechanism of the wire in the welding torch.

Additionally, the arc sensor detects change of welding current caused by oscillating the arc in a groove as a sensor signal, modifies the welding trajectory of the robot, and realizes copying of the welding line. Here, the change of welding current is a difference between hatched regions SL and SR shown in FIG. 13A. In other words, the welding current is controlled so as to equalize areas of regions SL and SR, thereby closing ΔX to 0 (welding current curve shown by a dashed line in FIG. 13A).

Figure 13B:
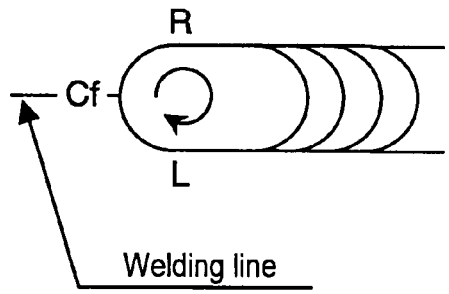
FIG. 13B shows a rotational position of an arc.
Figure 13C:
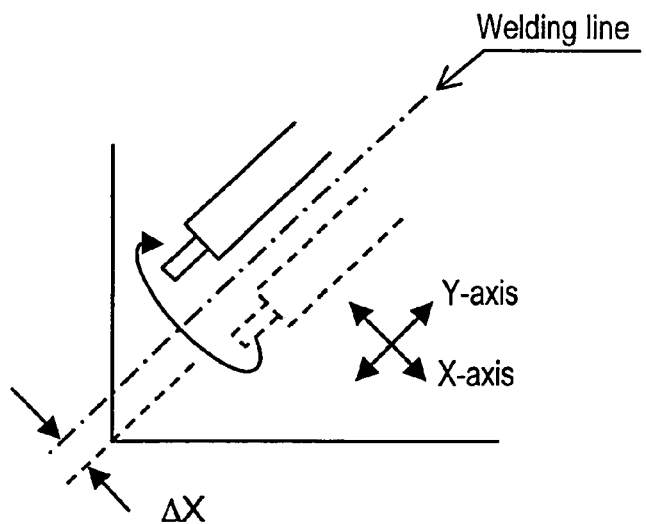
FIG. 13C shows a torch direction.

When ΔX is 0 over the whole welding section, a welding bead shown in FIG. 13B is obtained. In corner welding shown in FIG. 13C, the center path of the welding progress line traces a ridge of a corner of the work piece. Based on this principle, the arc sensor is used for keeping constant the displacement from the welding progress line and distance between the work piece and the welding torch.

The arc sensor employing the wire revolving method oscillates the wire by revolution, so that the number of detections of the difference signal by the arc sensor is about ten times more than that by the arc sensor employing the weaving method. The arc sensor employing the wire revolving method can realizes highly accurate welding line copying.

Even in a welding method such as TIG welding having no melting of an electrode, change of the distance between the work piece and the welding torch directly causes change of arc length and therefore can be detected as change of arc voltage. The arc sensor for TIG welding is commercialized.

The welding apparatus having the arc sensor of the wire revolution type of embodiment 2 is hereinafter described with reference to FIG. 2.

A motor for revolving wire 60 is disposed in arc sensor 93. In this motor, a pulse encoder plate having reduction ratio of 1/5 and 200 pulses/revolution is directly coupled to a motor shaft. A motor encoder pulse train is fed into amplifier 53 via control line A connected to the motor encoder. An internal circuit (not shown) of amplifier 53 increases the pulse train fourfold and determines and processes the pulse train every clockwise (CW)/counterclockwise (CCW) rotation direction of the motor. The fourfold pulse train processed every CW/CCW rotation direction is an UP/DOWN input signal to 12-bit UP/DOWN counter 54.

Thus, one revolution of the wire generates 4000 encoder pulses. A reference pulse called Z pulse that occurs once every one rotation of the motor occurs five times every one revolution of the wire.

In previously teaching the start of welding, the teaching is performed so that the start point of the wire is point Cf shown in FIG. 13B in starting the arc welding. During the teaching, the arc sensor controller stores the number of pulses as an offset value in RAM 52. Here, the pulses are those having occurred in a range from start point Cf of the wire revolution to the first Z pulse point. The offset value is used for recognizing the origin position (position of Cf) of the wire.

When the welding system of FIG. 2 is automatically operated and welding torch 7 reaches a predetermined welding start position of work piece 9, namely point a of FIG. 4, robot controller 1 adds the previously stored welding condition to welding controller 3 through the parallel bus. The welding condition includes welding current command value 200 A and welding voltage command value 24.0 V in the case of FIG. 4. Then, robot controller 1 transmits, as an immediate value, the moving speed (welding speed 0.8 m/minute in the case of FIG. 4) of the tip (arc occurring point) of wire 60 of welding torch 7 of the robot in the welding route to the welding controller by the method of embodiment 1. When an arc answer to the welding start command is returned from welding controller 3, robot controller 1 transmits a control start command of the arc sensor to arc sensor controller 5 through the parallel bus.

CPU portion 50 of arc sensor controller 5 then controls amplifier 53 in response to an algorism of ROM 51 and controls arc sensor 93 connected to amplifier 53 via control line A to revolve wire 60 with the motor disposed in arc sensor 93. This motor has the pulse encoder and revolves wire 60 at a constant speed with several tens Hz. CPU portion 50, simultaneously with the revolution, moves welding torch 7 along a predetermined welding route of work piece 9 to perform the arc welding at the previously stored welding speed.

A method of controlling the arc sensor using an UP/DOWN counter is described hereinafter. Amplifier 53 in arc sensor controller 5 includes 12-bit UP/DOWN counter 54 for counting rotational frequency of the motor disposed in arc sensor 93. The memory of RAM 52 includes an absolute value counter for counting the number of revolutions of the wire to recognize a position in a wire revolution amount. The absolute value counter takes a value in a range of 0 to 4000 pulses (360°) as shown in FIG. 10B, and the count value is reset at 0 when it reaches 4000 pulses.

After the starting of the arc, 12-bit UP/DOWN counter 54 performs UP count with CW pulses (the arrow direction of FIG. 13B), and performs DOWN count with CCW pulses (the opposite direction against the arrow of FIG. 13B). When a first Z pulse is detected, CPU portion 50 writes the offset value as the UP/DOWN counter value in response to the algorism stored in ROM 51.

CPU portion 50 then counts the number of encoder pulses from position Cf of FIG. 13B every predetermined sampling cycle in response to the algorism stored in ROM 51. The sampling cycle is 125 pulses (11.25°). A pulse count output every 125 pulses acts as a trigger, and CPU portion 50 transmits a conversion start output to two A/D converters 34, 35 disposed in welding controller 3 through signal line I.

Thus, in FIG. 2, a real welding current value is obtained with DCCT (Hall device) 42 and A/D converter 34, and a real welding voltage value is obtained with bleeder resistor 43 and A/D converter 35.

Arc sensor controller 5 A/D-converts the real welding current and voltage every 32-dividing signal (125 pulses/revolution). In other words, arc sensor controller 5 A/D-converts them every 11.25° in rotation angle during the revolution of 360° of the wire. As shown in FIG. 10A, respective 12-bit A/D converters convert welding current 500 A to 10V and welding voltage 50V to 10V in a circuit (not shown). Therefore, when the real welding current value is 200 A and the real welding voltage value is 24 V, values after the A/D conversion are 334 Hex (820 (10)) and 3D8 Hex (984 (10)).

The A/D conversion is performed every 32-dividing signal of CW/CCW pulses. After the A/D conversion, an output control module (not shown) supplies the resultant data in a data format shown in FIG. 10C from arc sensor controller 5 to robot controller 1 through the parallel bus. The resultant data includes a set of three data, namely wire position data (a value in the absolute value counter), the real welding current, and the real welding voltage value, in that order. In other words, when the real welding current and voltage values are 200 A and 24 V at arc point Cr of FIG. 13B, namely wire position 180° (2000 pulses) during the arc sensor control, a set of three data, 27D0 Hex (or 37D0 Hex), 0334 Hex, and 13D8 Hex are transmitted in a data format shown in FIG. 10C. Such data is thus transmitted to robot controller 1 through the parallel bus every predetermined sampling cycle in the welding apparatus of embodiment 2.

Robot controller 1 produces a welding current graph or a welding voltage graph as shown in FIG. 13A based on the set of three data every 11.25° in wire position. In other words, change of the welding current value, namely a difference signal between hatched regions SL and SR, is calculated as a sensor signal every 90°, namely points Cf, R, Cr, L, Cf, etc. in FIG. 13A, using an ideal welding current waveform and the real welding current waveform. The ideal welding current waveform is shown by the dashed line and produced when there is no displacement in the welding route shown by the dashed line of FIG. 13A, and the real welding current waveform is shown by the solid line of FIG. 13A and produced based on the sampling data.

Robot controller 1 controls the welding torch mounted to the tip of the robot body so that ΔX is 0, thereby correcting the trajectory of the tool center point (TCP) of the welding torch in real time. Here, the fact that ΔX is 0 means that trajectory of the wire revolution center shown in FIG. 13C, namely a welding line (the direction from Cf to Cr shown in FIG. 13B), traces a ridge of a corner of the work piece in a corner welding portion of FIG. 13C.

When welding torch 7 reaches the welding end point, namely point b of FIG. 4, robot controller 1 transmits the control end command of the arc sensor to arc sensor controller 5 through the parallel bus. On receiving the control end command of the arc sensor, arc sensor controller 5 stops the wire at position Cf of FIG. 13B with amplifier 53. Simultaneously with the operation by the arc sensor controller, robot controller 1 performs the following processes of:

transmitting a previously stored crater welding condition (welding current command value 160 A and welding voltage command value 21.5 V in the case of FIG. 2) to welding controller 3;
stopping the robot;
executing the welding end command in response to the crater processing;
performing a known stick check, and
moving robot body 6 to a next teaching point when wire 60 is not fused to work piece 9.

In embodiment 2, the arc sensor controller for detecting a real welding condition including welding current or welding voltage during welding and correcting the welding route or the welding condition command is also coupled to the common parallel bus. Thus, the correction of the welding route required for welding or transmission of the welding condition command or the real welding condition is performed digitally through the parallel bus in a parallel method.

When the wire revolution speed during arc sensor control is assumed to be 50 Hz, sampling interval is 0.625 msec because processing in a wire revolution cycle of 20 msec is performed with the 32-dividing signal (125 pulses/revolution). When a set of three data, namely wire position data (a value in the absolute value counter), the real welding current, and the real welding voltage are transmitted from arc sensor controller 5 to robot controller 1, the transmission period of the welding system is 0.16 msec (maximum). Real time processing can be thus secured. This cannot be realized in conventional systems.

The arc welder of embodiment 2 does not require a detector or the like for obtaining a real welding condition separately from the detector of the welding controller. Therefore, displacement of real welding current and voltage values from true values due to existence of a plurality of detectors is prevented from extending, true arc welding situation can be accurately observed, and therefore accurate arc sensor control can be realized. When data length is 16 bits, signal processing period can be about 1/16 that of the serial communication and transmitting-receiving period can be extremely reduced. Therefore, optimal welding control having speedy and quick information transmission is allowed. Robot controller performs part of the processing of the sensor signal such as a difference signal between hatched regions SL and SR shown in FIG. 13A in embodiment 2; however, preferably, the arc sensor controller performs the signal processing when the CPU portion can certainly execute the signal processing in real time.

Thus, in the arc welder of the arc welding robot system of exemplary embodiment 2, control systems in robot controller 1 and arc sensor controller 5 are digital circuits mainly including a microcomputer. The arc sensor controller for detecting a real welding condition including welding current or welding voltage during welding and correcting the welding route or the welding condition command is also coupled to the common bus of the system. Thus, the correction of the welding route required for welding or the transmission of the welding condition command or the real welding condition between arc welding robot controller 1 and arc sensor controller 5 can be performed digitally via sensor information in a parallel method.

Specifically, a rack mounting type motherboard having a plurality of bus slots is disposed in robot controller 1 as shown in FIG. 6, and the arc sensor controller shown in FIG. 8 is inserted into one of the bus slots for connection.

(Exemplary Embodiment 3)

An arc welder employing a dual port RAM in accordance with exemplary embodiment 3 will be described hereinafter with reference to FIG. 3.

Figure 3:
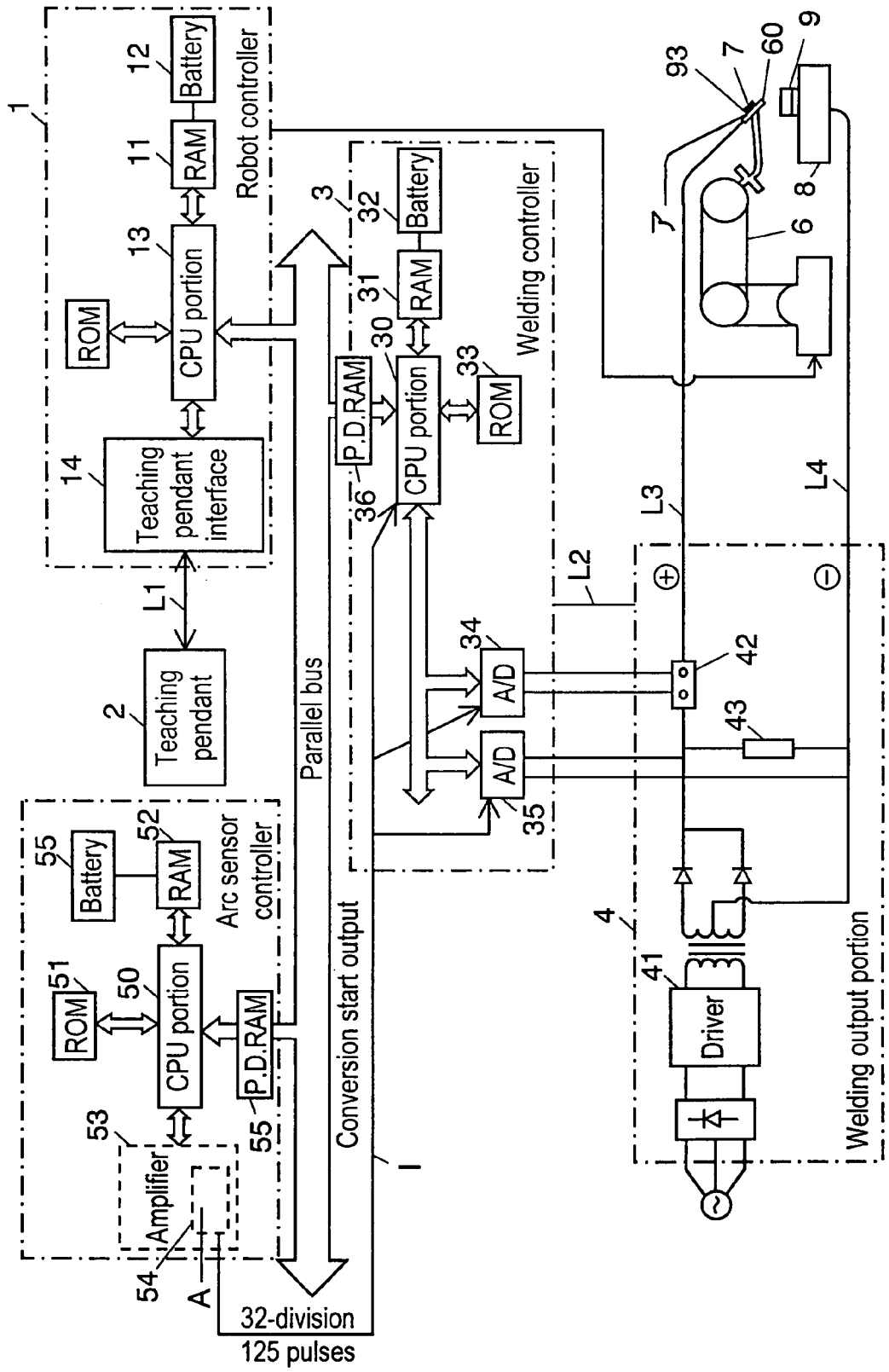
FIG. 3 is a block diagram of an arc welder in accordance with exemplary embodiment 3 of the present invention.

In FIG. 3, in addition to the elements in exemplary embodiments 1 and 2, the arc welder of exemplary embodiment 3 has dual port RAMs 36, 55. Same elements used in embodiment 1 or embodiment 2 in FIG. 1 and FIG. 2 are denoted with the same reference numbers, and their detailed descriptions are omitted.

In FIG. 3, dual port RAMs 55 and 36 are disposed on parallel buses of arc sensor controller 5 and welding controller 3 on the slave side, respectively. Coupling of robot controller 1 to robot body 6 or welding controller 3, a teaching method of a program to the robot, an automatic operation, a data format, and control by an arc sensor are the same as those in embodiment 1 or 2, and the descriptions of them are omitted.

In the arc welder of embodiment 3, the dual port RAMs (DPRAMs) have a control circuit for preventing the competition between an address bus and a data bus, and have a hardware configuration allowing the access to the common RAM from two CPU portions on the master side and the slave side. The DPRAMs can be accessed from robot controller 1 on the master side and arc sensor controller 5 or welding controller 3 on the slave side. While arc sensor controller 5 reads or writes data through an access port of DPRAM 55, robot controller 1 can read data through another access port.

The data can be therefore, easily transmitted from the master side to the slave side, or from the slave side to the master side through the DPRAM without adjusting the address bus and the data bus. Thus, data and parameter can be efficiently communicated without requiring synchronization between two CPU portions.

A pulse count output every 32-division (125 pulses) acts as a trigger, and a conversion start output is fed into two A/D converters disposed in welding controller 3 via signal line I, and the conversion start output is also supplied as an interrupt signal to CPU portion 30.

Real welding current and voltage values are written into a predetermined address in DPRAM 36 by CPU portion 30, and a flag indicating the writing of the real welding current and voltage values into a predetermined address in hardware is set simultaneously by the writing operation. Robot controller 1, on finding the flag indicating the writing, accesses the predetermined address and reads the real welding current and voltage values. This reading operation resets the flag indicating the writing in hardware at the reading time.

The arc welder of embodiment 3 has the DPRAMs in the parallel buses, so that the arc welder has higher communication speed and provides more precise control comparing with that of embodiment 1 or 2.

(Exemplary Embodiment 4)

An arc welder in accordance with exemplary embodiment 4 will be described hereinafter with reference to FIG. 14 and FIG. 15.

Figure 14:
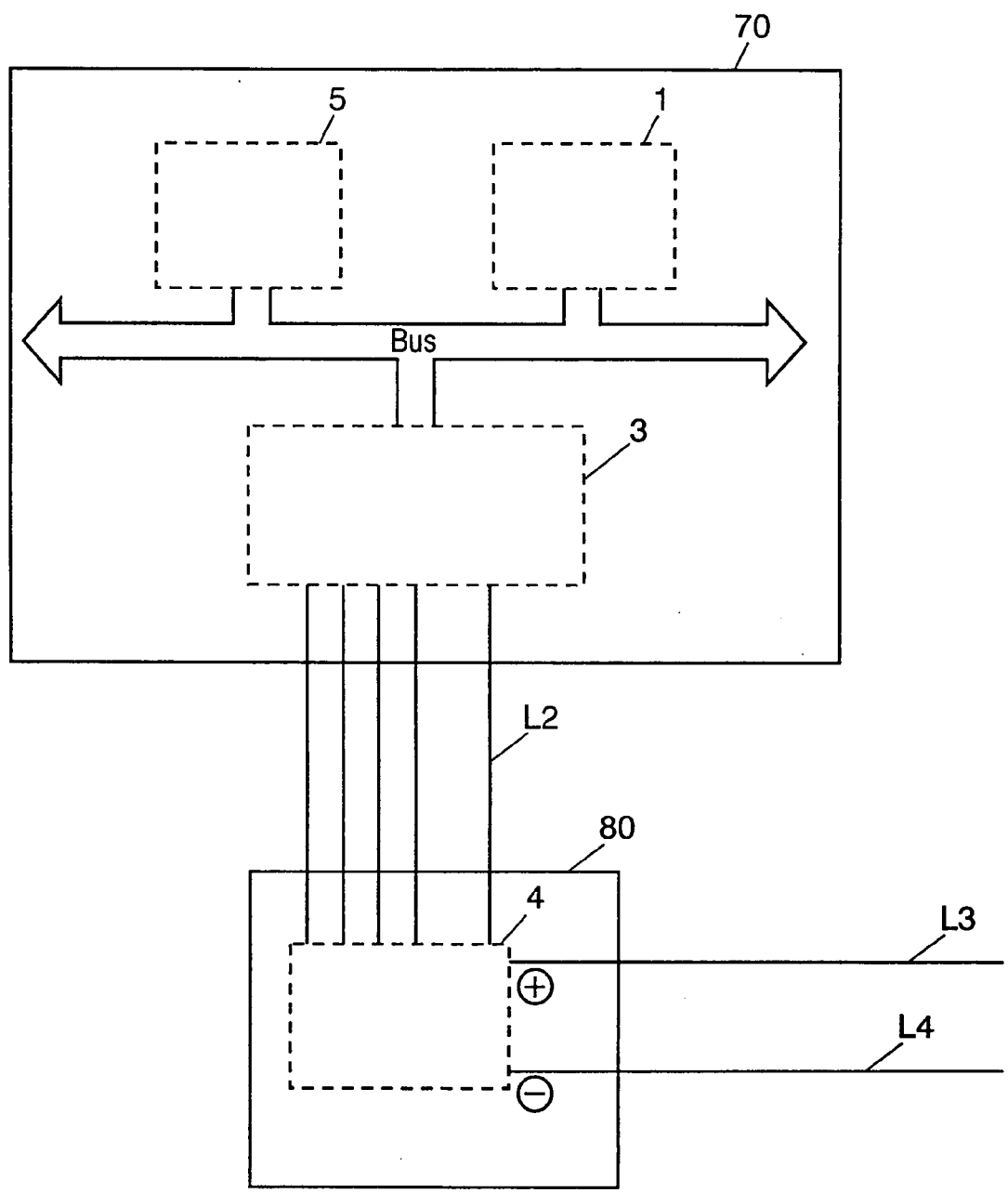
FIG. 14 is a block diagram in which an electro-magnetically shielded welding output portion is a single device.

In FIG. 14, in addition to the elements in exemplary embodiments 1 to 3, the arc welder of exemplary embodiment 4 has robot controller box 70 and an electro-magnetically shielding box 80. Same elements used in embodiment 1 to embodiment 3 in FIG. 1 to FIG. 3 are denoted with the same reference numbers, and their detailed descriptions are omitted.

Robot controller box 70 includes robot controller 1, welding controller 3, and arc sensor controller 5 that are inter-coupled through a bus in FIG. 14. Electro-magnetically shielding box 80 includes welding output portion 4. Welding controller 3 and welding output portion 4 are inter-coupled through control line L2, and + output L3 and − output L4 are outputted from welding output portion 4.

In FIG. 14, welding output portion 4 shown in one of embodiment 1 to 3 is disposed in electro-magnetically shielding box 80 other than robot controller box 70.

As discussed in embodiment 1, the CPU portion disposed in welding controller 3 switching-drives a driver in the welding output portion with a control circuit via control line L2, thereby generating welding energy and supplying the energy to a work piece via + output L3 of welding output portion 4. The work piece is coupled to − output L4 of welding output portion 4 through base metal. When a wire contacts with the work piece, electric energy flows from the tip of the wire to the work piece to start to melt metals of respective parts of the wire and the work piece, thereby starting the arc welding.

Since welding output portion 4 is disposed in electro-magnetically shielding box 80 other than robot controller box 70, each controller can be protected from electromagnetic induction noise caused in switching driving of the driver and welding controller 3, and welding output portion 4 can be easily replaced with each other. The arc welder of embodiment 4 shown in FIG. 14 has high maintainability and can easily respond to a different welding method.

Figure 15:
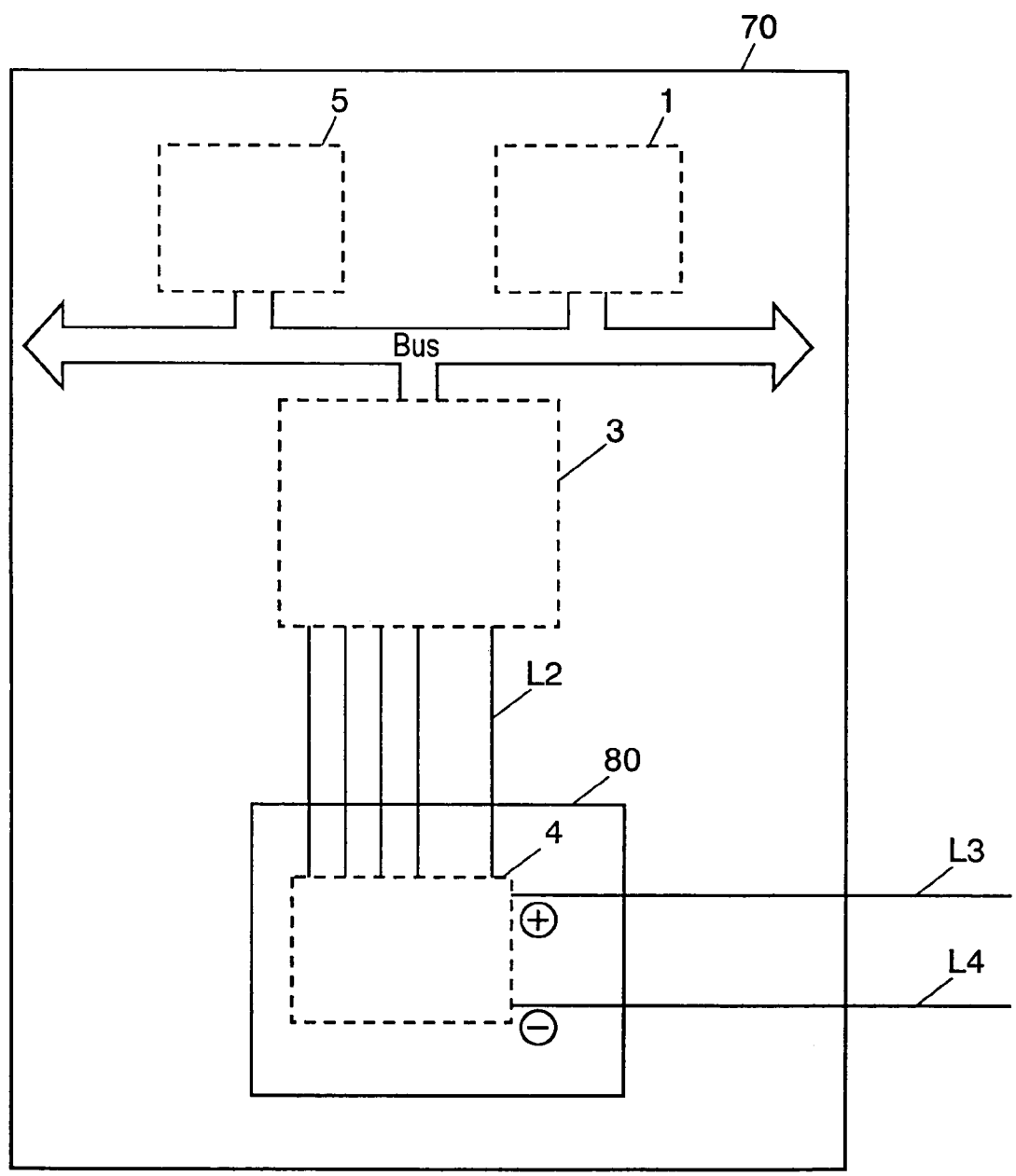
FIG. 15 is a block diagram in which the electro-magnetically shielded welding output portion and each controller is integrally formed.
Figure 16:
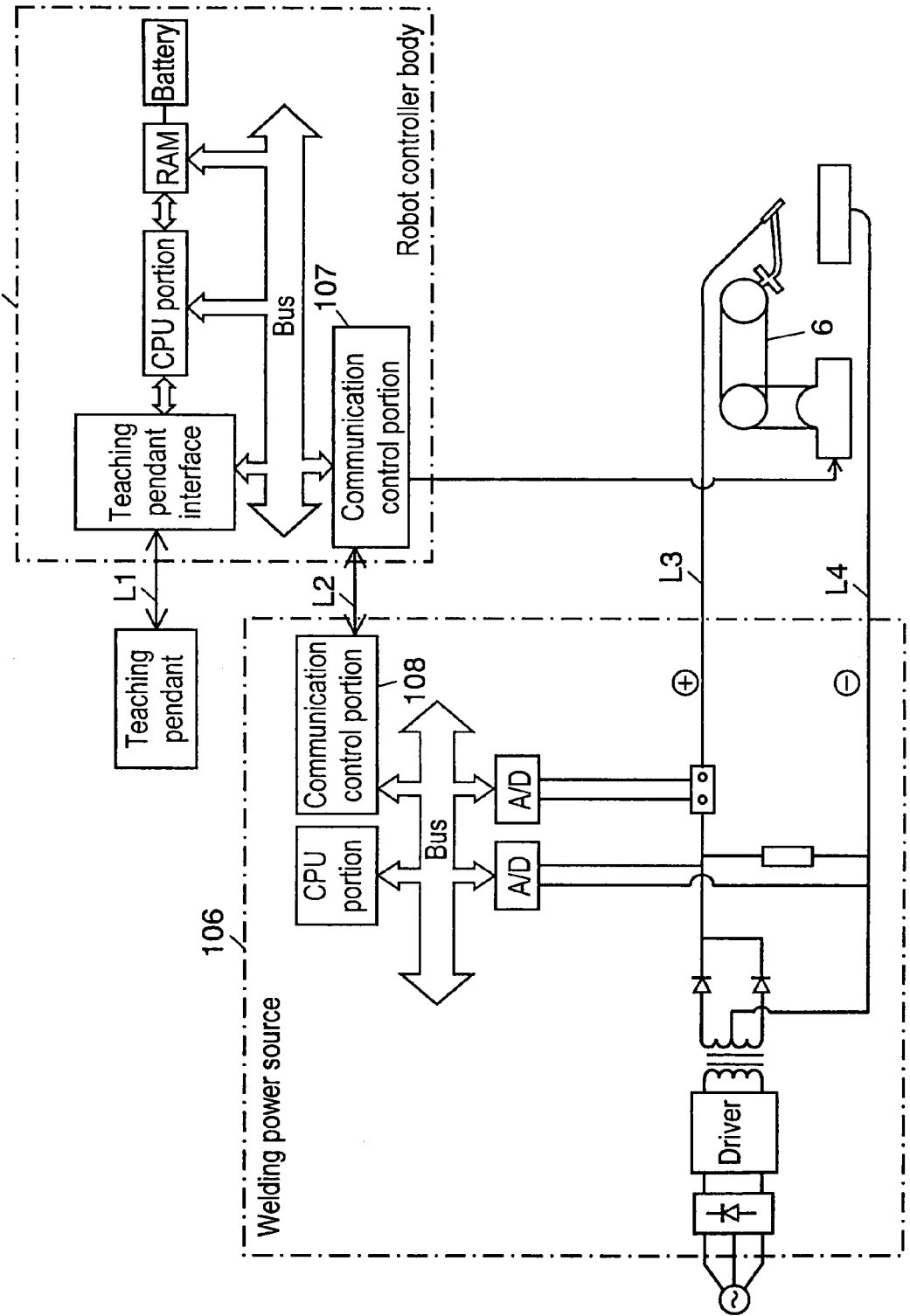
FIG. 16 is a block diagram of a welding apparatus of conventional example 2.
Figure 17:
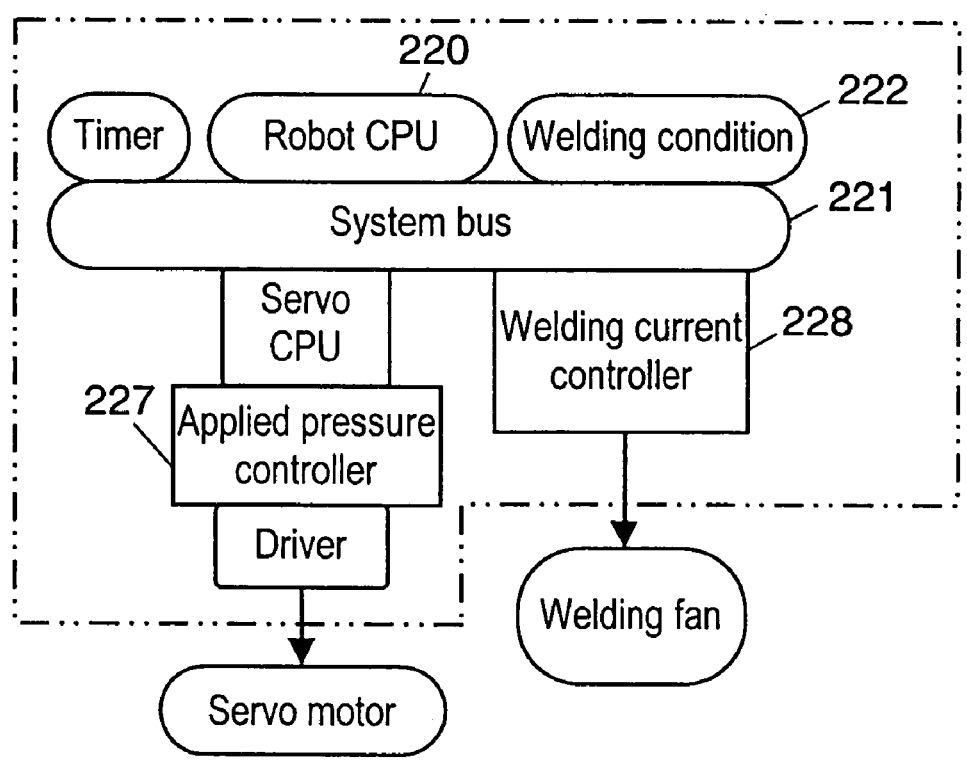
FIG. 17 is a block diagram of a welding apparatus of conventional example 3.
Figure 18:
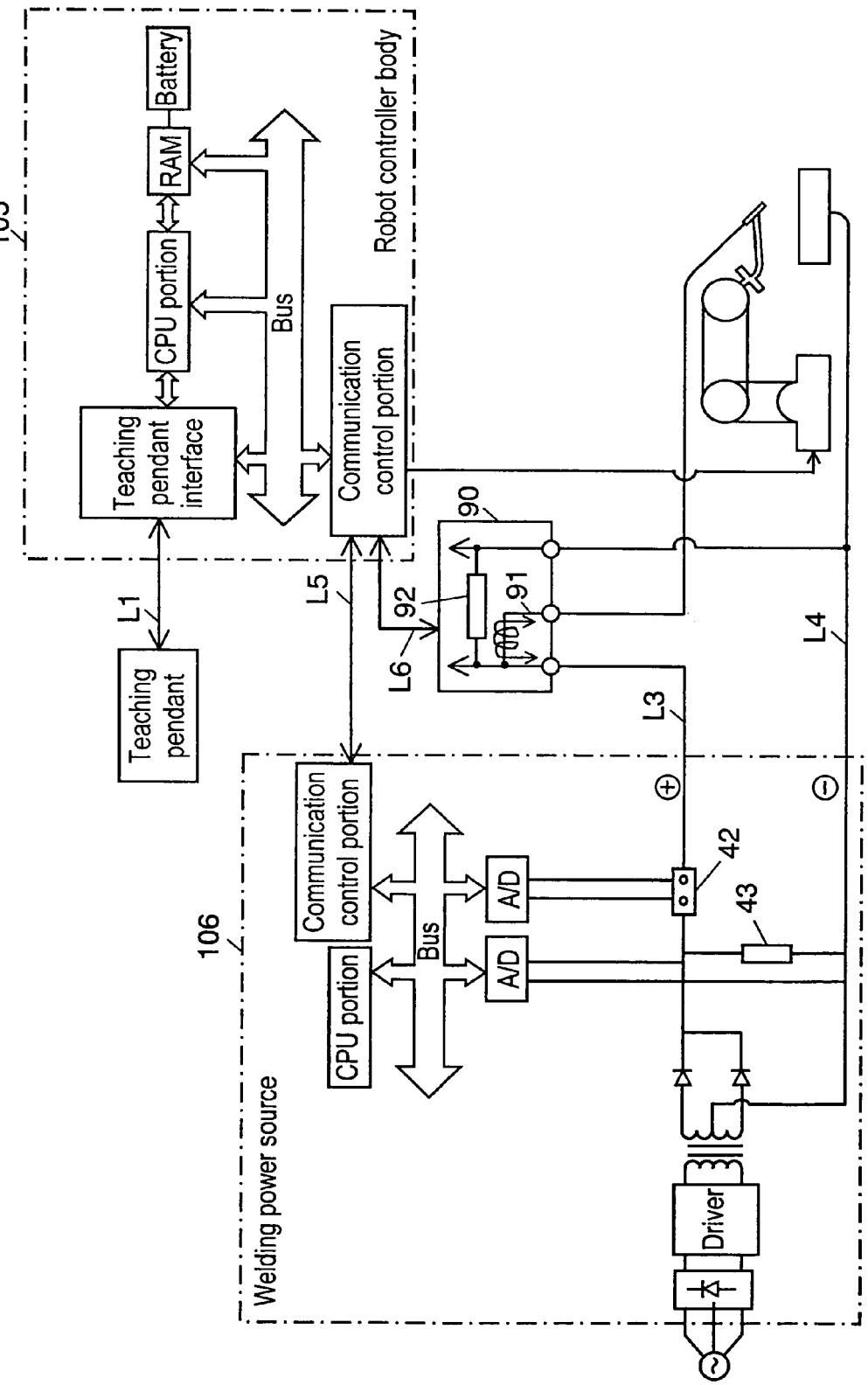
FIG. 18 is a block diagram of a welding apparatus of conventional example 4.

In FIG. 15, an arc welder of embodiment 4 has electro-magnetically shielding box 80 for shielding welding output portion 4 in robot controller box 70. Distance between welding controller 3 and welding output portion 4 can be shortened in this arc welder, so that control line L2 does not need to be special. For example, a wire having received noise reduction treatment of a degree similar to that of a twisted pair wire can be employed for control line L2. Welding controller 3 and welding output portion 4 can be disposed in the same box, so that the installation space can be advantageously minimized.

Electro-magnetically shielding box 80 is formed of ferromagnetic material such as iron, and welding output portion 4 is disposed in the electro-magnetically shielding box separately from robot controller 1, welding controller 3, and arc sensor controller 5, in any arc welder of embodiment 4. Communication of information between controllers can be smoothed without being affected by welding noise of the welding output portion.

(Exemplary Embodiment 5)

An arc welder in accordance with exemplary embodiment 5 will be described hereinafter with reference to FIG. 2 and FIG. 5. FIG. 2 has been used in the descriptions of exemplary embodiment 2. In FIG. 2, in addition to the elements in exemplary embodiments 3, the arc welder of exemplary embodiment 5 has batteries 12, 32, 55 and ROM 10. The other elements have been described in embodiment 3, and their descriptions are omitted.

In FIG. 2, battery 12 is coupled to RAM 11 disposed in robot controller 1, battery 32 is coupled to RAM 31 disposed in welding controller 3, and battery 55 is coupled to RAM 52 in an arc sensor controller. The other couplings have been described in embodiment 2, and their descriptions are omitted.

FIG. 5 is an outline drawing of a teaching pendant. The teaching pendant has liquid crystal screen 21, cursor 22, cursor moving keys 23, numeric keys 24, storage key 25, and correction key 26.

In the arc welder of embodiment 5, welding parameters such as a welding method, a wire type, and a wire diameter are set in the welding controller or the arc sensor controller using a teaching pendant for operating a robot. The teaching pendant is coupled to a robot controller of a teaching playback type robot. The teaching pendant is shown in FIG. 5, for example.

The method of controlling welding is the same as that in embodiment 1 or 2 and is omitted, and setting (not described) of a variable welding condition is described hereinafter. The variable welding condition includes a wire diameter, a wire material, a wire type, or a relation between a current detector and an A/D converter. The relation is required for the arc sensor controller, and is information indicating that AD data 7FF Hex in 12-bit AD data conversion of FIG. 10A is equivalent to welding current 600 A, for example. The variable welding condition can be variably set with TP2 for teaching coupled to robot controller 1 as necessary by communication through control line L1 of communication line.

These variably set values are stored in respective static RAM 11, RAM 31, and RAM 52 of robot controller 1, welding controller 3, and arc sensor controller 5. The set values are also stored in battery 12, battery 32, and battery 55 for backing up memory data in shutting off a main power.

A setting example of parameters required for the arc sensor controller is described with reference to TP liquid crystal display screen 21 shown in FIG. 5. When an operator intends to change a relation between current detector 34 and an A/D converter that is required for the arc sensor controller to arbitrary value, for example after replacing welding output portion 4 with another one, the operator operates TP 2 to display contents shown in FIG. 12 on liquid crystal display screen 21. This operation algorism and the screen design are stored in RAM 10. All data required for each controller is stored also in RAM 11.

When the contents shown in FIG. 12 are displayed on liquid crystal display screen 21 of the teaching pendant of FIG. 5, cursor 22 initially lies at position "6" of "600 (A)". The operator moves cursor 22 to a desired digit position with cursor moving keys 23 shown in FIG. 5, and then inputs a desired numerical value with numeric keys 24. Then, the operator presses storage key 25. The input value at this time is a welding current value equivalent to AD data 7FF Hex.

For changing a set value of the other parameter, the operator displays a desired one of liquid crystal screens 21 shown in FIG. 12 using a page up key (not shown) and a page down key (not shown), moves the cursor to a desired parameter position with cursor moving keys 23, and performs the setting change.

When the operator fails to input an input value, the operator clears the value with correction key 26 at a desired parameter position and then inputs a correct value with numeric keys 24, or overwrites the correct value at the desired parameter position with numeric keys 24. For finishing the setting change, the operator presses end key 27. On pressing end key 27, a parameter required for the arc sensor controller is transmitted from robot controller 1 to arc sensor controller 5 through the parallel bus in FIG. 7.

Thus, parameter change required for the arc sensor controller has been described as an example. The change of parameters required for various controllers such as the welding controller and the arc sensor controller can be performed commonly using the teaching pendant for operating the robot by the method discussed above. These variably set values are stored in respective static RAM 11, RAM 31, and RAM 52 of the robot controller, the welding controller, and the arc sensor controller, as discussed above. The set values are also stored in battery 12, battery 32, and battery 55 for backing up memory data in shutting off the main power.

Various controllers are inter-coupled and integrated through the parallel bus, so that an operation portion for each controller is not required. The teaching pendant for operating the robot is shared for operating each controller, thereby improving convenience in real use by an operator.

Each controller has a RAM and a battery for backing up the RAM data and can hold the variable value data also during main power shutdown. Data required for each controller does not need to be transmitted from the robot controller every time the power is turned on, so that the initial time can be reduced conveniently.

Digital values are transmitted through the parallel bus in the welding apparatus of the present invention, so that the welding apparatus does not require a converting means from the digital values to analog values, allows signal transmission having no conversion error, and is not affected by a drift of an analog circuit or by difference between analog circuits after changing a device. A required time in digital communication is shorter than that in analog communication, so that information transmission is speedy to allow rapid welding control. Therefore, the execution of a series of welding start commands (arc-on sequence) or welding end commands (arc-on sequence) does not need to be started slightly before the welding start point or the welding end point. In other words, control by snap decision is not required, and the tact time can be reduced while securing a reliable welding result.

The arc welder of the present invention does not require a detector or the like for obtaining real welding condition values separately from the detector of the welding controller. Therefore displacement of real welding current and voltage values from true values due to existence of a plurality of detectors is prevented from extending, true arc welding situation can be accurately observed, and therefore accurate arc sensor control can be realized. When data length is 16 bits, signal processing period can be about ¹⁄₁₆ that of the serial communication, and transmitting-receiving period can be extremely reduced. Therefore, optimal welding control having speedy and quick information transmission is allowed.

In an arc welder of the present invention, each CPU portion can perform easy, fast, and certain bus control providing the shortest information transmission route without requiring complex adjustment of timings of transmission procedures.

In an arc welder of the present invention, the welding output portion is stored in an electro-magnetically shielding storing box different and separate from a robot controller box, thereby replacing the welding controller and the welding output portion with each other. The arc welder can have high maintainability and easily respond to a different welding method.

In an arc welder of the present invention, the welding output portion is stored in an electro-magnetically shielding storing box disposed in a robot controller box, thereby largely advantageously minimizing the installation space.

In an arc welder of the present invention, parameter setting required for the robot controller, the welding controller, and the arc sensor controller can be performed commonly using a teaching pendant for robot operation coupled to the robot controller of a teaching playback type robot, so that convenience of an operator is improved.

INDUSTRIAL APPLICABILITY

The present invention is related to a welding apparatus such as an arc welder of a welding robot system formed of a combination of a robot, a welding power source, and an arc sensor controller. Respective controllers constituting the system are inter-coupled through a bus, thereby providing the arc welder that has high real time processing performance and is more integrated.

What is claimed is:

1. An arc welder comprising:
a robot controller for communicating instructions; and
a welding power source, having a welding controller which receives instructions from said robot controller relating to welding current and/or welding voltage; and
a common detector which detects results including welding current and/or welding voltage, said common detector transmits said detected results which are used for both a) welding machine control to control welding current and/or welding voltage; and b) arc sensor control to control welding position.

2. An arc welder according to claim 1,
wherein said detected results are communicated through a parallel bus between said robot controller, and said welding power source.

3. An arc welder according to claim 2,
wherein at least one of the welding current and the welding voltage is digitally communicated via a dual port RAM (DPRAM) between said robot controller and said welding power source in parallel.

4. An arc welder according to claim 3,
wherein welding parameters such as a welding method, a wire type, and a wire diameter are set in one of a welding controller of said welding power source which includes said common detector and an arc sensor controller, the setting being performed commonly using a teaching pendant for robot operation coupled to said robot controller.

5. An arc welder according to claim 3,
wherein a welding controller and a welding output portion of said welding power source are separated from each other and the welding output portion is electro-magnetically shielded, the welding controller and the welding output portion constituting said welding power source.

6. An arc welder according to claim 3,
wherein said welding power source having an electro-magnetically shielded welding output portion and a welding controller separated from the welding output portion is disposed in said robot controller.

7. An arc welder according to claim 2,
wherein welding parameters such as a welding method, a wire type, and a wire diameter are set in one of a welding controller of said welding power source which includes said common detector and an arc sensor controller, the setting being performed commonly using a teaching pendant for robot operation coupled to said robot controller.

8. An arc welder according to claim 2,
wherein a welding controller and a welding output portion of said welding power source are separated from each other and the welding output portion is electro-magnetically shielded, the welding controller and the welding output portion constituting said welding power source.

9. An arc welder according to claim 2,
wherein said welding power source having an electro-magnetically shielded welding output portion and a welding controller separated from the welding output portion is disposed in said robot controller.

10. An arc welder according to claim 1,
wherein said welding controller and a welding output portion of said welding power source are separated from each other and the welding output portion is electro-magnetically shielded.

11. An arc welder according to claim 10,
wherein the welding output portion is electro-magnetically shielded by ferromagnetic material.

12. An arc welder according to claim 11,
wherein the ferromagnetic material is iron.

13. An arc welder according to claim 1,
wherein said welding power source having an electro-magnetically shielded welding output portion is disposed in said robot controller.

14. An arc welder according to claim 13,
wherein the welding output portion is electro-magnetically shielded by ferromagnetic material.

15. An arc welder according to claim 1,
wherein welding parameters such as a welding method, a wire type, and a wire diameter are set in said welding controller using a teaching pendant.

* * * * *